United States Patent [19]
Klein

[11] 3,859,047
[45] Jan. 7, 1975

[54] STANDARD FOR SERUM CHOLESTEROL DETERMINATION

[75] Inventor: Bernard Klein, New Hyde Park, N.Y.

[73] Assignee: Hoffman-La Roche Inc., Nutley, N.J.

[22] Filed: May 29, 1973

[21] Appl. No.: 364,789

[52] U.S. Cl. .............................. 23/230 B, 252/408
[51] Int. Cl. ........................................... G01n 33/16
[58] Field of Search .................. 23/230 B; 252/408; 260/397.2

[56] References Cited
UNITED STATES PATENTS
3,001,950 9/1961 Hopper ............................ 23/230 B
3,558,516 1/1971 Wybenga ...................... 23/230 B X

*Primary Examiner*—Robert M. Reese
*Attorney, Agent, or Firm*—Samuel L. Welt; Jon S. Saxe; R. Hain Swope

[57] ABSTRACT

Stable, water-soluble, substantially pure organic salts of cholesteryl hemisuccinate selected from the group consisting of the morpholine salt, the cyclohexylamine salt and the tris (hydroxymethyl) aminomethane salt and methods for their use. The claimed water-soluble cholesterol salts are useful as standards for the determination of cholesterol in biological fluids.

3 Claims, No Drawings

STANDARD FOR SERUM CHOLESTEROL DETERMINATION

BACKGROUND OF THE INVENTION

In recent years the significance of the levels of cholesterol in human blood has been the subject of much study by medical science. Cholesterol is present in reasonably constant levels in the blood of normal, healthy humans. The levels of cholesterol in the blood which are measured are referred to as total serum cholesterol. Total serum cholesterol includes all those cholesterol compounds which are present in blood such as cholesterol and its derivatives dihydrocholesterol and 7-dihydrocholesterol whether present in the free form or in the form of esters with the fatty acids normally present in the blood.

The interest in determining the total cholesterol content of blood is due to evidence which indicates there might be a correlation between elevated serum cholesterol levels and certain conditions such as atherosclerosis. Also, human beings suffering from diabetes, certain liver diseases and nephrosis have often been found to have elevated serum cholesterol levels. It is therefore readily apparent that accurate determination and monitoring of the cholesterol levels in the blood would be most useful both in terms of mass screening procedures and as an adjunct to therapeutic treatment of patients with established disease.

These are a number of methods which are commonly utilized in clinical laboratories for the determination of total cholesterol in biological fluids. Although the method of Abell et al. has been generally considered to be the reference procedure, it suffers the disadvantages of being cumbersome and time consuming. Several simplified variants of the Abell et al. procedure presently in use are less cumbersome and time consuming than the original procedure, but they introduce varying degrees of possible error into the determination. Examples of potential errors and disadvantages in such methods include those due to the instability of reagents and/or colors formed in the course of the procedure and interference with the analytical determination by other constituents of the biological fluid, e.g., serum. Accuracy of results, however, in any chemical analytical operation is dependent on comparing the absorbance of the test solution containing a known amount of the pure substance, i.e., the standard solution. The reliability of the results must also be subjected to continuous or periodic evaluation and/or monitoring of the procedure, equipment and reagents. Such monitoring operations are best accomplished, also, through the use of standard solutions containing predetermined amounts of the substance to be tested in a form which can be carried through the entire analysis in this instance, cholesterol. Another way in which monitoring can be accomplished is by analysis of serum of known cholesterol content. Cholesterol, per se, is not soluble in biological fluids such as serum. This insolubility, prior to the present invention, has been responsible for the lack of an effective primary cholesterol standard which simulates the clinical specimen in that, it can be submitted to all unit operations of the analytic procedure.

A problem encountered with existing serum cholesterol control materials is that, in some instances, lyophilized forms thereof do not readily dissolve upon reconstitution with water. Certain cholesterol control materials known in the art do redissolve in water with comparative ease but do not form clear solutions. As the potential commercial success of laboratory control materials is far greater if they are available in a dry form which is readily reconstitutable in water to form clear, stable solutions such disadvantages can be serious.

In accordance with the present invention, organic cholesterol salts are provided which are readily soluble in water to form clear, stable solutions and which are ideally suited for use as cholesterol standards in analytical procedures. Further, the cholesterol salts of the present invention, when utilized as cholesterol control materials in conventional laboratory determinations, are free from the above enumerated disadvantages in prior art control materials. In addition, aqueous solutions of the cholesterol salts of the present invention, in contrast to prior art cholesterol control materials, can be utilized to reconstitute lyophilized whole serum.

DETAILED DESCRIPTION OF THE INVENTION

In accordance with the present invention, novel, water-soluble standards for the determination of cholesterol in biological fluids which comprise organic salts of cholesterol, i.e., salts of cholesteryl hemisuccinate with an organic base selected from the group consisting of morpholine, cyclohexylamine and tris (hydroxymethyl) aminomethane are provided.

Cholesteryl hemisuccinate is prepared according to the present invention by the reaction of equimolar amounts of cholesterol and succinic anhydride. The reaction is carried out at reflux temperature in the presence of an organic base such as, for example, pyridine. The product, which is recrystallized from an organic solvent such as, for example, acetone to a mp of 177.5° to 179.5°C. may be isolated or utilized directly to form the novel salts of the invention. The synthesis of cholesteryl hemisuccinate in accordance with the invention has been found to produce a higher yield of purer product utilizing pyridine as a solvent than the synthesis described in the literature which utilizes succinoyl chloride or succinic anhydride in benzene solution.

The novel organic salts of cholesteryl hemisuccinate are formed in accordance with the present invention by reacting cholesteryl hemisuccinate with at least an equivalent amount of the respective organic base, i.e., morpholine, cyclohexylamine or tris (hydroxymethyl) aminomethane. The reactions are advantageously carried out in the presence of an organic solvent such as, for example, acetone, ethanol, chloroform, dimethylformamide and the like. The thus-formed salts are crystalline substances which form stable aqueous solutions and which dissolve in biological fluids such as, for example, whole serum to form clear, stable solutions. Solutions of the novel salts of cholesteryl hemisuccinate in accordance with the invention have been found to yield positive results with all analytical test procedures usually utilized for the determination of cholesterol. The consistency of results of such procedures utilizing the novel cholesterol salts of the invention has been found to be unaffected by the certain substances normally present in biological fluids, e.g., bilirubin. Additionally, it has been found that the cholesteryl hemisuccinate salts of the invention, when added to biological fluids such as serum, do not interfere with other analytical tests usually carried out thereon thus making them highly useful as the cholesterol member of multiple component analytical standards and control materials. The cholesterol salts of the invention are readily soluble in water in an amount equivalent to 600 mg. free cholesterol per 100 ml. and in biological fluids such as cholesterol-free serum in an amount equivalent to about 400 mg. of free cholesterol. For common analytical procedures, however, an amount of salt equivalent to form about 50 mg. to about 400 mg. of cholesterol per 100 ml., dissolved in 5 ml. water is used to reconstitute a lyophilized 5 ml. sample of the biological fluid to be tested. These amounts are chosen as they represent the practical levels of cholesterol in the blood. Aliquots of from 0.10 to 0.50 ml. of the reconstituted serum are utilized as standards for most analytical procedures.

The novel cholesterol salts of the present invention may be supplied per se in dry form or as standard stock solutions. It is preferred to incorporate into aqueous solutions containing the organic salts of cholesteryl hemisuccinate described herein a slight excess of the respective organic base i.e., from about 3 percent to about 5 percent, preferably about 4 percent weight to volume based on the volume of the final solution. The presence of such excess an amount of excess base is preferred to insure complete clarity of the aqueous solutions. It is also preferred to incorporate into aqueous solutions of the novel cholesterol salts of the invention a small quantity, for example, about 0.1 percent weight to volume of a non-ionic surface active agent. Suitable surface active agents include, for example, one or a mixture of arylalkyl polyether alcohols available under the tradename Triton from Rohm & Haas Co., Philadelphia, Pa. The choice of a surfactant is not critical to the invention and other non-ionic surfactants recognized in the art as being of a similar nature could be utilized as well.

The following Examples further illustrate the invention. Unless otherwise noted, all temperatures are in degrees Centigrade.

EXAMPLE 1

A total of 38.6 g. (0.1 mol) cholesterol and 10.0 g. (0.1 mol) succinic anhydride were dissolved in 100 ml. of dry pyridine and the resulting solution heated under reflux for 8.5 hours and then evaporated under reduced pressure. The resulting moist residue was taken up in 50 ml. of boiling acetone and crystallized therefrom to yield 28.0 g. (58 percent) of crude product having a mp of 154°–171°. The product was purified by recrystallization twice from acetone and once from absolute ethanol to yield chromatographically pure cholesteryl hemisuccinate, mp 177.5°–179.5°.

A total of 4.86 g. (10 mmol) of the cholesteryl hemisuccinate formed above was dissolved in 50 ml. chloroform and 2.0 g. morpholine (23 mmol) was added thereto. The solution was stirred for 10 minutes and then evaporated to dryness under vacuum. The product was recrystallized three times from ethyl acetate to yield pure cholesteryl hemisuccinate morpholine salt, mp 173°–175°.

EXAMPLE 2

In a manner analogous to that described in Example 1, cholesteryl hemisuccinate was reacted on an equimolar basis with tris (hydroxymethyl)aminomethane to yield a salt having a mp of 212°–216° and with cyclohexylamine to form a salt having a mp of 194°.

EXAMPLE 3

For purposes of testing the cholesteryl hemisuccinate salts of the invention as a cholesterol standard, 593.7 mg. of the product of Example 1 was mixed with 4.0 ml. morpholine in a 100-ml. volumetric flask. To this mixture was added 1.0 ml. of a 10 percent aqueous solution of Triton X-100* in 50 ml. deionized water. The solution was warmed to about 60° with magnetic bar stirring. The temperature was maintained with stirring until the opalescent solution cleared. The clear solution was allowed to cool to room temperature and diluted to 100 ml. with deionized water.

*Polyethyleneglycol ether of monoiso-octyl phenol, Rohm & Haas, Inc., Philadelphia, Pa.

For comparison purposes, a cholesterol standard was prepared by dissolving 400 mg. of cholesterol in 100 ml. of absolute alcohol with heating.

In Table I, below, the analysis of cholesterol standard solutions is given by the Liebermann-Burchard reaction utilizing the procedure of Abell et al. described in *Stand. Methods Clin. Chem.* Vol. 2, p. 26 (1958). In this method, an aliquot (0.5 ml.) of serum or, in this instance, the test solution is saponified with alcoholic potassium hydroxide and then extracted into 10 ml. hexane. A 2.0 ml. aliquot of the hexane extract is then evaporated to dryness and the residue taken up in glacial acetic acid. The resulting solution is treated with a mixture of acetic anhydride, acetic acid and concentrated sulfuric acid and the absorbance measured. The alcoholic cholesterol standard as well as each of eleven samples of aqueous solution of cholesteryl hemisuccinate morpholine salt were tested at a concentration of 400 mg. Readings were taken as absorbances measured in 1 cm cuvets in a Beckman DBG Spectrophotometer. The cholesterol content of each sample was then determined therefrom.

TABLE I

| Sample | (Liebermann-Burchard Method) | | Difference Percent |
|---|---|---|---|
| | 620 nm | mg/100 ml | |
| Cholesterol Standard | 0.294 | 400 | – |
| Test Solution A | 0.289 | 393 | –1.7 |
| Test Solution B | 0.287 | 390 | –2.5 |
| Test Solution C | 0.291 | 396 | –1.0 |
| Test Solution D | 0.293 | 398 | –0.5 |
| Test Solution E | 0.305 | 415 | +3.8 |
| Test Solution F | 0.285 | 388 | –3.0 |
| Test Solution G | 0.290 | 395 | –1.3 |
| Test Solution H | 0.330 | 402 | +0.5 |
| Test Solution I | 0.299 | 407 | +1.8 |
| Test Solution J | 0.295 | 402 | +0.5 |
| Test Solution K | 0.291 | 396 | –1.0 |
| Mean | 0.296 | 398.4 | 1.6 |

Utilizing as a standard the solution of cholesterol in absolute alcohol prepared above, a series of tests were run utilizing a modified Technicon Auto Analyzer method of the Kiliani-Zak reaction as described by Block et al., Clin. Chem. Vol. 12 p. 681 (1966). In this method, an aliquot (0.5 ml.) of serum or test solution was extracted with 9.5 ml. isopropanol and a portion of the extract treated with an appropriate amount of a reagent prepared by dissolving 825 mg. of anhydrous ferric chloride in a mixture of two liters of glacial acetic acid and one liter of concentrated sulfuric acid. The absorbance of the pink solution which formed was measured at 560 nm. The results are reported in Table II.

TABLE II (Automated Kiliani-Zak Method)

| Sample | 560 nm | mg/100 ml | Difference Percent |
|---|---|---|---|
| Cholesterol Standard | 0.632 | 400 | — |
| Test Solution A | 0.644 | 408 | 2.0 |
| Test Solution B | 0.648 | 410 | 2.5 |
| Test Solution C | 0.660 | 417 | 4.3 |
| Test Solution D | 0.647 | 409 | 2.3 |
| Test Solution E | 0.649 | 410 | 2.5 |
| Test Solution F | 0.655 | 414 | 3.5 |
| Test Solution G | 0.625 | 396 | 1.0 |
| Test Solution H | 0.648 | 410 | 3.5 |
| Mean | 0.647 | 409 | 2.7 |

The results in Tables I and II clearly indicate that the cholesteryl hemisuccinate salts of the invention, as exemplified by the morpholine salt, are readily utilizable as a standard in the two principal laboratory analytical procedures, i.e., the Liebermann-Burchard and the Kiliani-Zak. In both test methods, the mean differences in absorbance between the test solutions and the ethanolic cholesterol standard did not exceed a 2.7 percent.

EXAMPLE 4

The following experiment demonstrates the utility of the cholesteryl hemisuccinate salts of the invention as a serum control additive or as ingredients in recovery analysis operations. Aqueous solutions having concentrations of the product of Example 1, cholesteryl hemisuccinate morpholine salt, equivalent to 100 mg., 200 mg. and 400 mg. cholesterol per 100 ml., respectively, were prepared. Samples of each of these solutions were mixed with an equal volume of a serum pool and analyzed in triplicate in the automated method of Example 3. The results are set forth in Table III.

TABLE III (Analysis of Aqueous Standard & Serum)

| Sample | Cholesterol Content mg/100 ml Calculated | Found | Recovery (%) |
|---|---|---|---|
| Serum Pool | — | 186 | — |
| Pool & 100 mg | 143 | 149 | 103.5 |
| Pool & 200 mg | 193 | 193 | 100.0 |
| Pool & 400 mg | 293 | 289 | 98.5 |
| | | Mean | 100.7 |

For a further demonstration of the ready utilization of the cholesteryl hemisuccinate salts of the invention as laboratory standards or controls, the following solutions of cholesteryl hemisuccinate morpholine salt were prepared.

| Solution | Content |
|---|---|
| A | Lyophilized cholesterol-free serum reconstituted in water. |
| B | Aqueous cholesterol standard containing sufficient cholesterol hemisuccinate morpholine salt to yield 400 mg/100 ml. |
| C | Same as B, separate sample. |
| D | Lyophilized cholesterol-free serum reconstituted in standard B. |
| E | Lyophilized cholesterol free serum reconstituted in Standard C. |
| F | Mixture of one part A and 2 parts B. |
| G | Mixture of one part A and 2 parts C. |

These solutions were tested again utilizing the automated system described in Example 3. The results are set forth in Table IV:

TABLE IV

| Sample | Cholesterol Content mg/100 ml Found | Calculated | Recovery % |
|---|---|---|---|
| Solution A | 0 | — | — |
| Solution D | 415 | 400 | 103 |
| Solution E | 407 | 400 | 101 |
| Solution F | 272 | 267 | 102 |
| Solution G | 271 | 267 | 101 |
| | | Mean | 101.8 |

I claim:

1. A method of checking the accuracy of a test for the quantitative determination of the cholesterol content of a biological fluid which comprises conducting said test on a standard comprising a solution in said biological fluid of a known quantity of a water-soluble cholesterol salt selected from the group consisting of the morpholine, cyclohexylamine and tris (hydroxymethyl) aminomethane salts of cholesteryl hemisuccinate.

2. The method of claim 1 wherein said solution also contains from about 3 percent to about 5 percent weight to volume, based on the volume of the final solution, of the respective organic base in excess of that present in the cholesterol salt and about 0.1 percent weight to volume of a non-ionic surfactant.

3. The method of claim 2 wherein said non-ionic surfactant is a polyethylene glycol ether of monoisooctyl phenol.

* * * * *